US012760770B2

(12) United States Patent
Oberdorfer et al.

(10) Patent No.: US 12,760,770 B2
(45) Date of Patent: Oct. 13, 2026

(54) AIR DISC BRAKE SYSTEM DRAG REDUCTION GUIDE PIN AND METHODS FOR THE USE AND ASSEMBLY THEREOF

(71) Applicant: Bendix Commercial Vehicle Systems LLC, Avon, OH (US)

(72) Inventors: Erik W. Oberdorfer, Akron, OH (US); Alan Backstrom, Madison, TN (US)

(73) Assignee: Bendix Commercial Vehicle Systems LLC, Avon, OH (US)

(*) Notice: Subject to any disclaimer, the term of this patent is extended or adjusted under 35 U.S.C. 154(b) by 432 days.

(21) Appl. No.: 18/367,189

(22) Filed: Sep. 12, 2023

(65) Prior Publication Data

US 2025/0084904 A1 Mar. 13, 2025

(51) Int. Cl.

| | |
|---|---|
| ***F16D 55/22*** | (2006.01) |
| ***F16D 55/2265*** | (2006.01) |
| ***F16D 55/227*** | (2006.01) |
| ***F16D 65/00*** | (2006.01) |
| *F16D 55/00* | (2006.01) |
| *F16D 121/08* | (2012.01) |

(52) U.S. Cl.

CPC ..... *F16D 55/22655* (2013.01); *F16D 55/227* (2013.01); *F16D 65/0068* (2013.01); *F16D 65/0087* (2013.01); *F16D 2055/0016* (2013.01); *F16D 2055/007* (2013.01); *F16D 2121/08* (2013.01); *F16D 2250/0084* (2013.01)

(58) Field of Classification Search

CPC ............ F16D 55/22655; F16D 55/227; F16D 65/0068; F16D 65/0087; F16D 2055/0016; F16D 2055/007; F16D 2121/08; F16D 2250/0084; F16D 55/2255; F16D 65/183

See application file for complete search history.

(56) References Cited

U.S. PATENT DOCUMENTS 4,027,750 A * 6/1977 Kawamoto ........... F16D 55/227 384/16
4,334,599 A * 6/1982 Ritsema ................ F16D 55/227 411/537

(Continued)

FOREIGN PATENT DOCUMENTS

| | | |
|---|---|---|
| CN | 208010805 U | 10/2018 |
| CN | 208311325 U | 1/2019 |
| KR | 2008-0071321 | 8/2008 |

OTHER PUBLICATIONS

International Search Report and Written Opinion for International Application No. PCT/US2024/045557 mailed Nov. 21, 2024 (11 pages).

*Primary Examiner* — Robert A. Siconolfi
*Assistant Examiner* — James K Hsiao
(74) *Attorney, Agent, or Firm* — Crowell & Moring LLP

(57) ABSTRACT

An air disc brake system includes a carrier having a mounting feature and a guide pin having a longitudinally extending relief passage. A caliper includes a longitudinally extending bore having spaced apart first and second ends, wherein the guide pin is received in the bore, and wherein the caliper is slidably mounted on the guide pin with the relief passage in fluid communication with the first and second ends of the bore. A fastener couples the guide pin to the carrier. A cap is coupled to the caliper and closes a second end of the bore. Methods of using and assembling the air disc brake system are also provided.

24 Claims, 10 Drawing Sheets

(56) References Cited

U.S. PATENT DOCUMENTS 4,343,381 A * 8/1982 Haraikawa ........ F16D 55/22655 188/73.39
4,351,421 A * 9/1982 Kurata .............. F16D 55/22655 188/73.45
4,401,194 A * 8/1983 Klassen ................ F16D 55/227 188/73.44
4,754,856 A * 7/1988 Villata .................. F16D 55/228 92/169.1
5,562,187 A * 10/1996 Tribuzio ........... F16D 55/22655 188/73.35
5,931,267 A * 8/1999 Iwata .................... F16D 55/227 188/73.44
5,957,245 A * 9/1999 Anger ................... F16D 55/227 188/258
6,315,087 B1 * 11/2001 Bodin ..................... B60T 1/065 188/73.45
7,284,642 B2 * 10/2007 Macke .................. F16D 55/227 188/73.44
7,337,881 B1 * 3/2008 Sherman ........... F16D 55/22655 188/72.4
8,783,425 B2 * 7/2014 Isono ................ F16D 55/22655 188/73.44
9,181,998 B2 * 11/2015 Isono .................. F16D 65/0068
9,309,936 B2 * 4/2016 Champion ........ F16D 55/22655
9,551,387 B2 * 1/2017 Smith ............... F16D 55/22655
10,197,119 B2 2/2019 Gaye et al.
10,280,992 B2 * 5/2019 Fischer ............. F16D 55/22655
10,323,703 B2 * 6/2019 Cool ................... F16D 65/0068
10,781,872 B2 * 9/2020 Jedele ................... F16D 55/227
11,649,862 B2 * 5/2023 Holtham ............... F16D 55/227 188/73.31
2006/0049008 A1 * 3/2006 Kinoshita ......... F16D 55/22655 188/73.39
2007/0029147 A1 * 2/2007 Macke .................. F16D 55/227 188/234
2011/0278104 A1 * 11/2011 Isono ................ F16D 55/22655 188/71.8
2014/0262637 A1 * 9/2014 Smith ................. F16D 65/0087 188/73.44
2015/0323022 A1 * 11/2015 Thomas ............ F16D 55/22655 408/1 R
2017/0335911 A1 * 11/2017 Roberts ...................... F16J 3/02
2018/0119760 A1 * 5/2018 Gerber .............. F16D 55/22655
2018/0274609 A1 * 9/2018 Cool ................... F16D 65/0056
2019/0162256 A1 * 5/2019 Taylor ................... F16D 55/227
2020/0132142 A1 * 4/2020 Jedele ................... F16D 55/227
2021/0239167 A1 * 8/2021 Holtham ............. F16D 55/2265

* cited by examiner

AIR DISC BRAKE SYSTEM DRAG REDUCTION GUIDE PIN AND METHODS FOR THE USE AND ASSEMBLY THEREOF

FIELD OF THE INVENTION

The present application relates generally to an air disc brake system, and in particular to an air disc brake system having a guide pin configured to reduce drag after braking, together with methods for the use and assembly thereof.

BACKGROUND

Air disc brake systems may be configured with opposing pairs of brake pads, with an inner brake pad actuated to engage one side of a brake rotor and an outer brake pad carried by a caliper engaging the other side of the rotor. Brake drag may occur if the caliper fails to completely release the brake pad after an operator releases the brakes. Brake drag may lead to premature wear of the brake pads and/or rotor, and may contribute to overheating and excess wear of various brake components and the resultant damage associated therewith.

In some air disc brake systems, the caliper slides on one or more guide pins, with a boot seal disposed between the caliper and the guide pin. In some circumstances, for example during assembly, air may be trapped in the boot seal, for example by grease accumulating in the interface between the guide pin and the caliper, which may cause the boot seal to balloon. Conversely, a vacuum may be created in the boot seal, leading to the collapse of the boot seal. In either scenario, the sliding of the caliper on the guide pin may be adversely affected, and may lead to brake drag.

SUMMARY

The present invention is defined by the following claims, and nothing in this section should be considered to be a limitation on those claims.

In one aspect, one embodiment of an air disc brake system includes a carrier having a mounting feature and a guide pin having longitudinally spaced first and second ends, an outer bearing surface having longitudinally spaced first and second ends, and an interior through hole extending between and open at the first and second ends of the guide pin. The guide pin includes a relief passage. In one embodiment, the relief passage extends longitudinally and is formed in the outer bearing surface. In another embodiment, the relief passage includes a passage communicating between the outer bearing surface and the through hole. A caliper includes a longitudinally extending bore having spaced apart first and second ends, wherein the guide pin is received in the bore, and wherein the caliper is slidably mounted on the guide pin with the relief passage in fluid communication with the first and second ends of the bore. A fastener is disposed in the through hole and includes a first end engaged with the mounting feature and a second end engaged with the guide pin. A cap is coupled to the caliper and closes a second end of the bore.

In another aspect, one embodiment of a method of assembling an air disc brake system includes inserting a guide pin into a bore of a caliper, wherein the bore has first and second ends. The guide pin has an outer bearing surface, an interior through hole extending between and open at first and second ends of the guide pin, and a relief passage in fluid communication with the first and second ends of the bore. The method further includes inserting a fastener into the through hole and engaging a mounting feature of a carrier and installing a cap on the caliper and closing the second end of the bore.

In another aspect, one embodiment of a guide pin for use in an air brake system has longitudinally spaced first and second ends, an outer bearing surface having longitudinally spaced first and second ends, an interior through hole extending between and open at the first and second ends of the guide pin, and a relief passage in fluid communication with the first end of the outer bearing surface and the second end of the guide pin.

Various other methods of using and assembling the air disc brake system are also provided.

The various embodiments of the air disc brake system and components, and methods for the use and assembly thereof, provide significant advantages over other air disc brake systems and methods. For example, and without limitation, the relief passage may help reduce or eliminate air trapped at one end of the bore, for example in the boot seal, and allow for air to flow in the relief passage and equalize the pressure. Specifically, trapped air may escape from one end of the bore, for example in the boot seal, thereby reducing brake drag and increasing performance.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1:
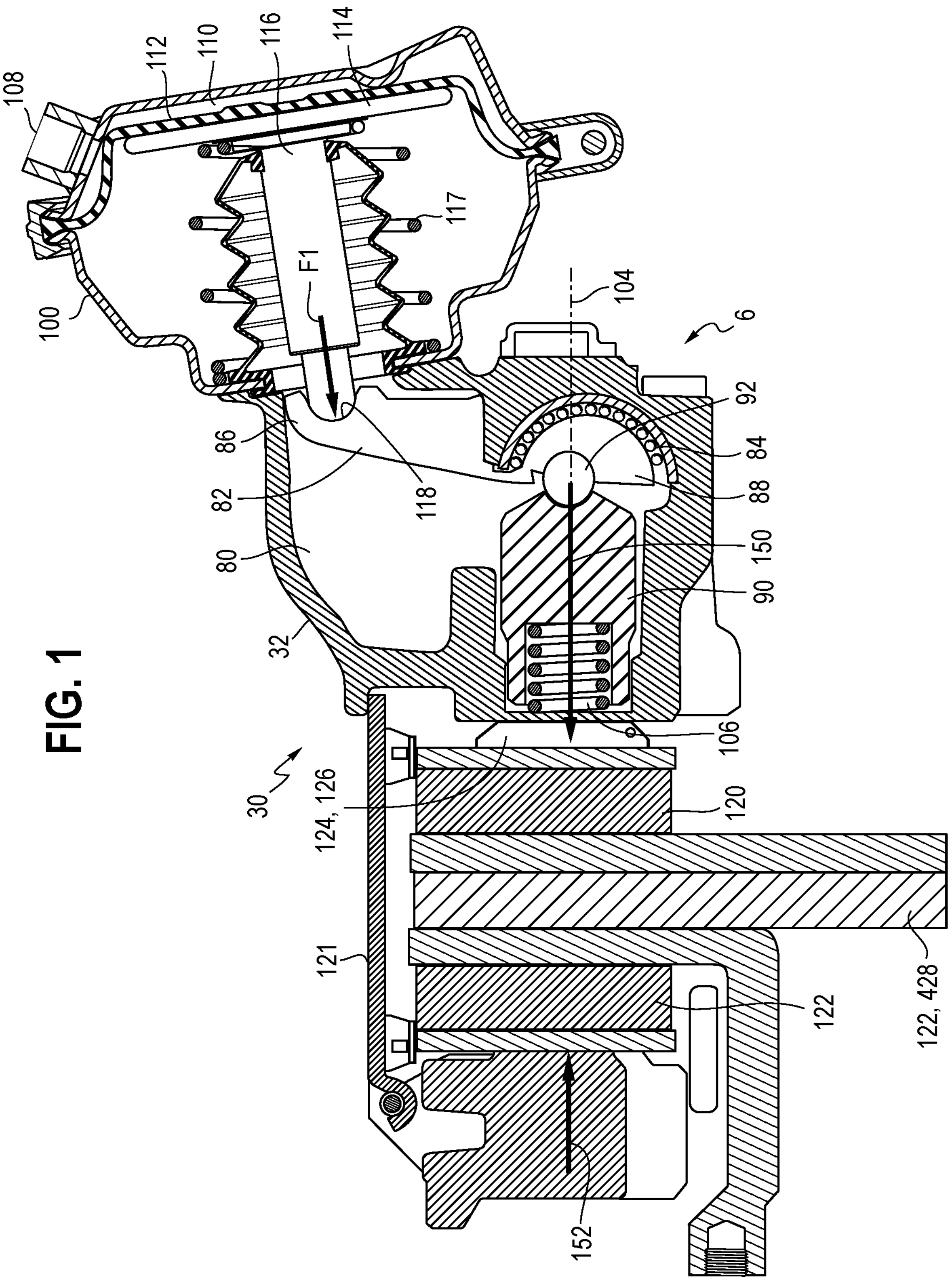
FIG. 1 is a first cross-sectional schematic view of one embodiment of an air disc brake system including an actuator.

It should be understood that the term "plurality," as used herein, means two or more. The term "longitudinal," as used herein means of or relating to a length or lengthwise direction 2, for example a direction running parallel to the axis of a guide pin 16, as shown for example in FIGS. 2 and 3. The term "lateral," as used herein, means situated on, directed toward or running in a side-to-side direction 4 transverse to the longitudinal direction 2. The term "transverse" means non-parallel. The term "outwardly" refers to a direction facing away from a centralized location, for example the phrase "radially outwardly" refers to a feature diverging away from a centralized location, for example axis 12 of the guide pin 16. It should be understood that features or components facing or extending "outwardly" do not necessarily originate from the same centralized point, but rather generally emanate outwardly and exteriorly along a non-tangential vector. Conversely, the term "inwardly" refers to a direction facing toward the centralized or interior location.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Referring to FIGS. 1-4, an air disc brake system 6 includes an anchor plate 8, 308 and a carrier 10, 310 connected to the anchor plate, for example with a plurality of fasteners 14, 314, which may include a combination of bolts and washers. The fasteners 14, 314 may be oriented parallel to the axis 12, or perpendicular to the axis 12. A pair of guide pins 16, 18 are mounted to the carrier 10, 310 with fasteners 20, 22, shown as bolts, and extend in the longitudinal direction 2. In one embodiment, a first guide pin 16 has a first length and a second guide pin 18 has a second length, with the first length being greater than the second length. It should be understood that more than two guide pins may be coupled to the carrier. In one embodiment, the guide pins 16, 18 are coupled to the carrier by way of the fasteners 20, 22 through a threadable engagement with the carrier 10, 310 or with nuts positioned on an opposite side of the carrier housing, although the guide pins may be coupled by press fit, welding or other known fastening techniques. Each guide pin 16, 18 has an outer circumferential bearing surface 24, 26. The guide pins may be cylindrical, or may have other shapes, including non-circular cross-sections.

A caliper 30 includes a housing 32 having a pair of bores 34, 36 positioned to receive the guide pins 16, 18 respectively. Each bore has a first and second end 402, 404. A cap 19 is coupled to close off the second end 404 of the bore 34, 36 and defines a chamber 406 at the second end of the bore. Each bore 34, 36, which are preferably cylindrical but may have other shapes, for example matching the shape of the guide pins 16, 18, has an inner circumferential surface 38, 40 defining a cross sectional area shaped to receive the guide pin 16, 18 and surrounding the outer circumferential surface 24, 26 of the guide pin 16, 18. A bushing 42, 44 is mounted in each bore 34, 36, for example by press fit, with the bushing engaging the inner circumferential surface 38, 40. The bushing 42, 44 defines an inner circumferential surface 46, 48, with the outer circumferential surface 24, 26 of the guide pin 16, 18 slidably engaging the inner circumferential surface 46, 48 of the bushing 42, 44. The bushing 42, 44 may be single bushing, or may be configured with one or more bushings, which may be spaced apart or engaged end-to-end.

A boot seal 72, 74 may be coupled to and disposed between the caliper housing 32 and the guide pin 16, 18. The boot seal 72, 74 may be configured with pleats, allowing the boot seal to expand and contract as the caliper 30 is moved relative to the guide pin 16, 18. The boot seal 72 defines a chamber 408 with the first end 402 of the bore 34, 36.

Figure 6A:
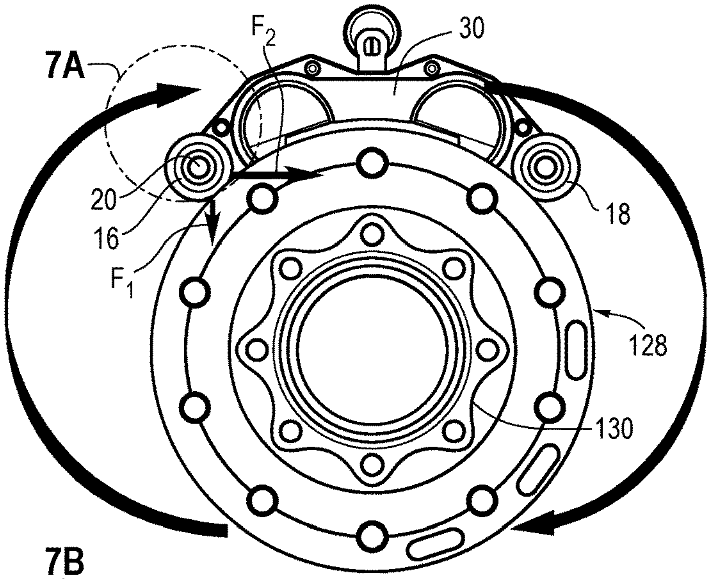
FIGS. 6A-C are front views of the caliper mounted in the first, second and third positions, and the loading conditions associated with each position.
Figure 6B:
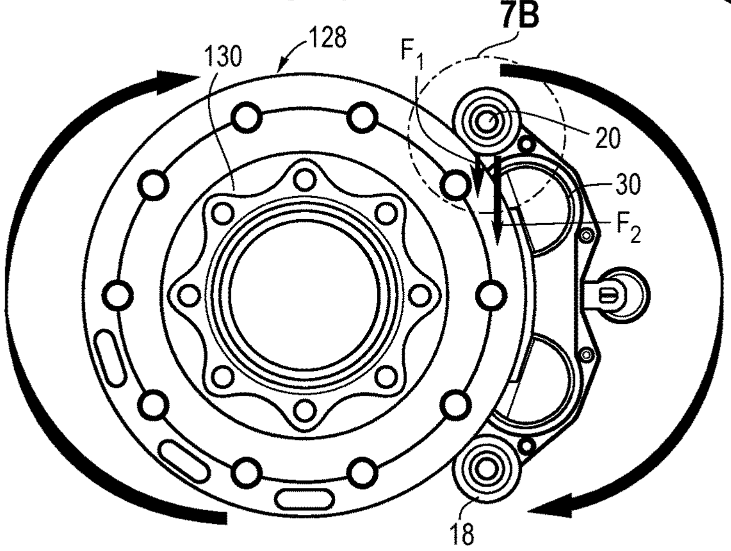
Figure 6C:
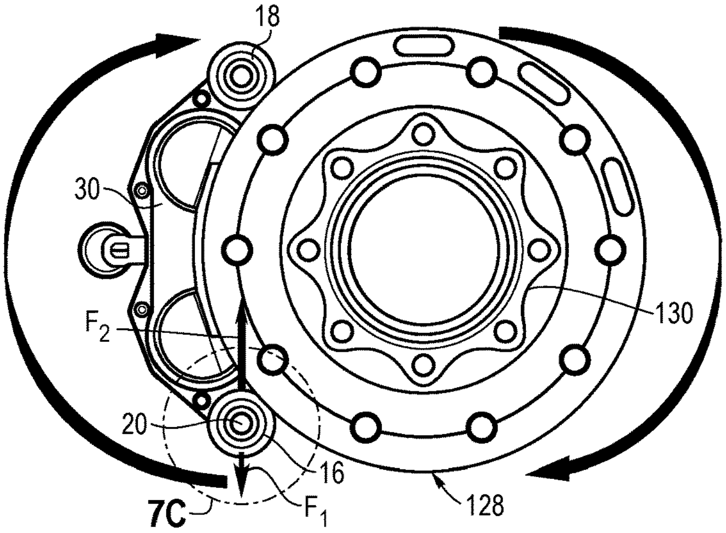
Figure 7A:
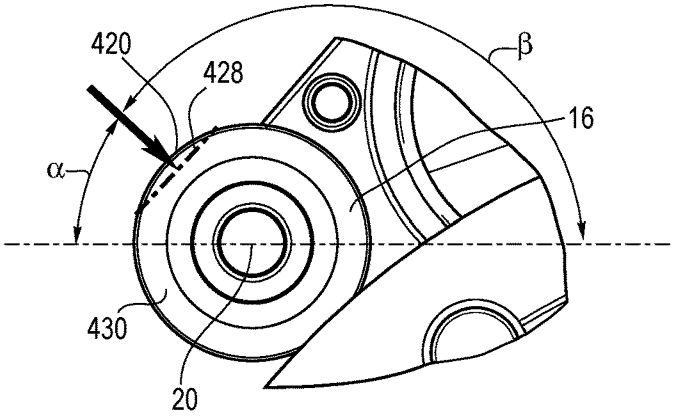
FIGS. 7A-C are enlarged cross-sectional view of the guide pin orientation corresponding to the first, second and third positions of the caliper.
Figure 7B:
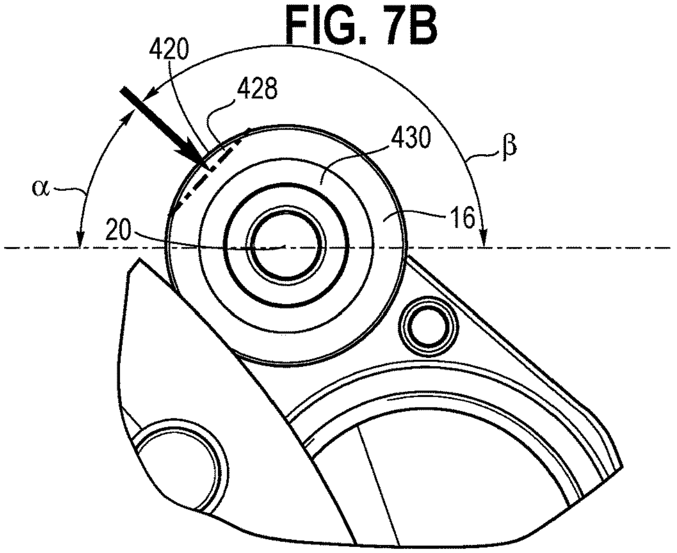
Figure 7C:
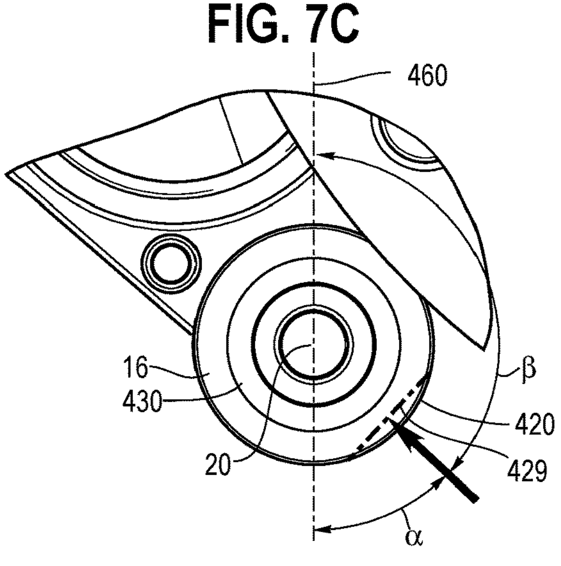
Figure 8:
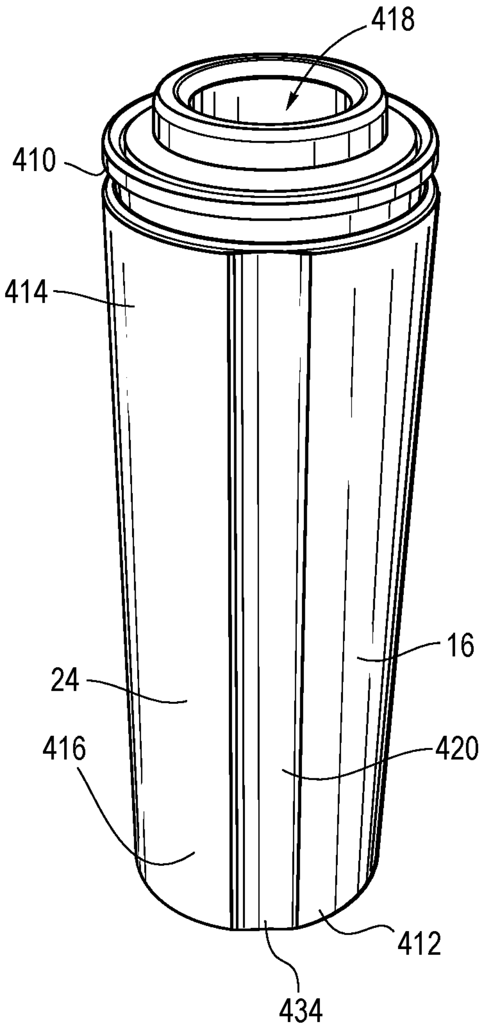
FIG. 8 is a perspective view of one embodiment of a guide pin.

Referring to FIGS. 5A-8, the guide pin 16 has longitudinally spaced first and second ends 410, 412, the outer bearing surface 24 having longitudinally spaced first and second ends 414, 416, and an interior through hole 418 extending between and open at the first and second ends 410, 412 of the guide pin 16. An annular groove 500 separates the outer bearing surface 24 and the first end 410 of the guide pin. An end 502 of the boot seal 72 may be disposed in the groove 500 and be trapped therein so as to anchor the boot seal 72. The first end 410 includes a longitudinally extending hub portion 504 having a smaller outer diameter than the diameter of the bearing surface 24, In one embodiment, the guide pin 16 includes a longitudinally extending relief passage 420. In one embodiment, the relief passage 420 extends between the first and second ends 414, 416 of the outer bearing surface 24. In other embodiments, the relief passage 420 extends between opposite rim portions of the guide pin 16. In the various embodiments, the relief passage 420 is in fluid (i.e., air or liquid) communication with longitudinally spaced apart first and second ends 402, 404 of the bore 34, and the chambers 408, 406 defined thereby. In one embodiment, the relief passage 420 may be defined by a longitudinally extending channel 434 extending radially inwardly from the bearing surface 24, as shown in FIG. 8. In other embodiments, shown for example in FIGS. 5A-7C, the relief passage 420 is formed by a flat 429 on the guide pin 16, with the guide pin having a major segment cross-section 430 and the relief passage having a minor segment cross-section as shown in FIGS. 7A-C taken orthogonal to the longitudinal axis 12. The major segment is a segment of the cross section where the arc length is greater than half the circumference of the circle. While the relief passage 420 is shown as being applied to the guide pin 16, it should be understood that the relief passage 420 may also be applied to the guide pin 18, or to both guide pins 16, 18, or to any number of guide pins if more than two guide pins are used to interface between the caliper and carrier.

Figure 3:
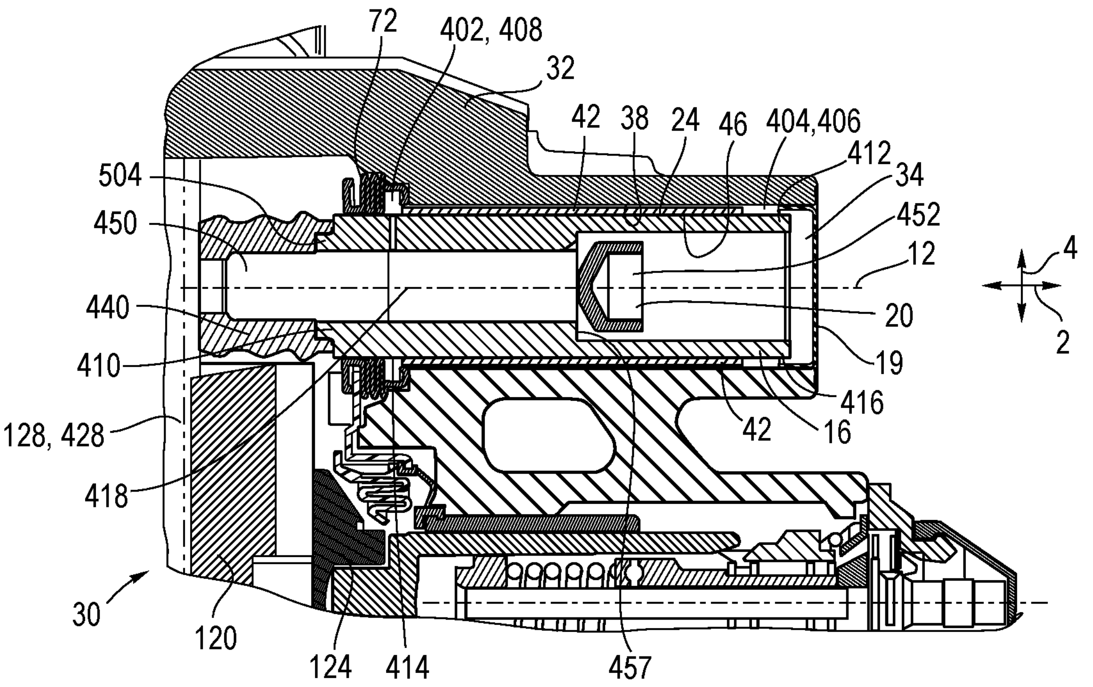
FIG. 3 is an enlarged partial view of the air disc brake system taken along line 3 of FIG. 2.
Figure 4:
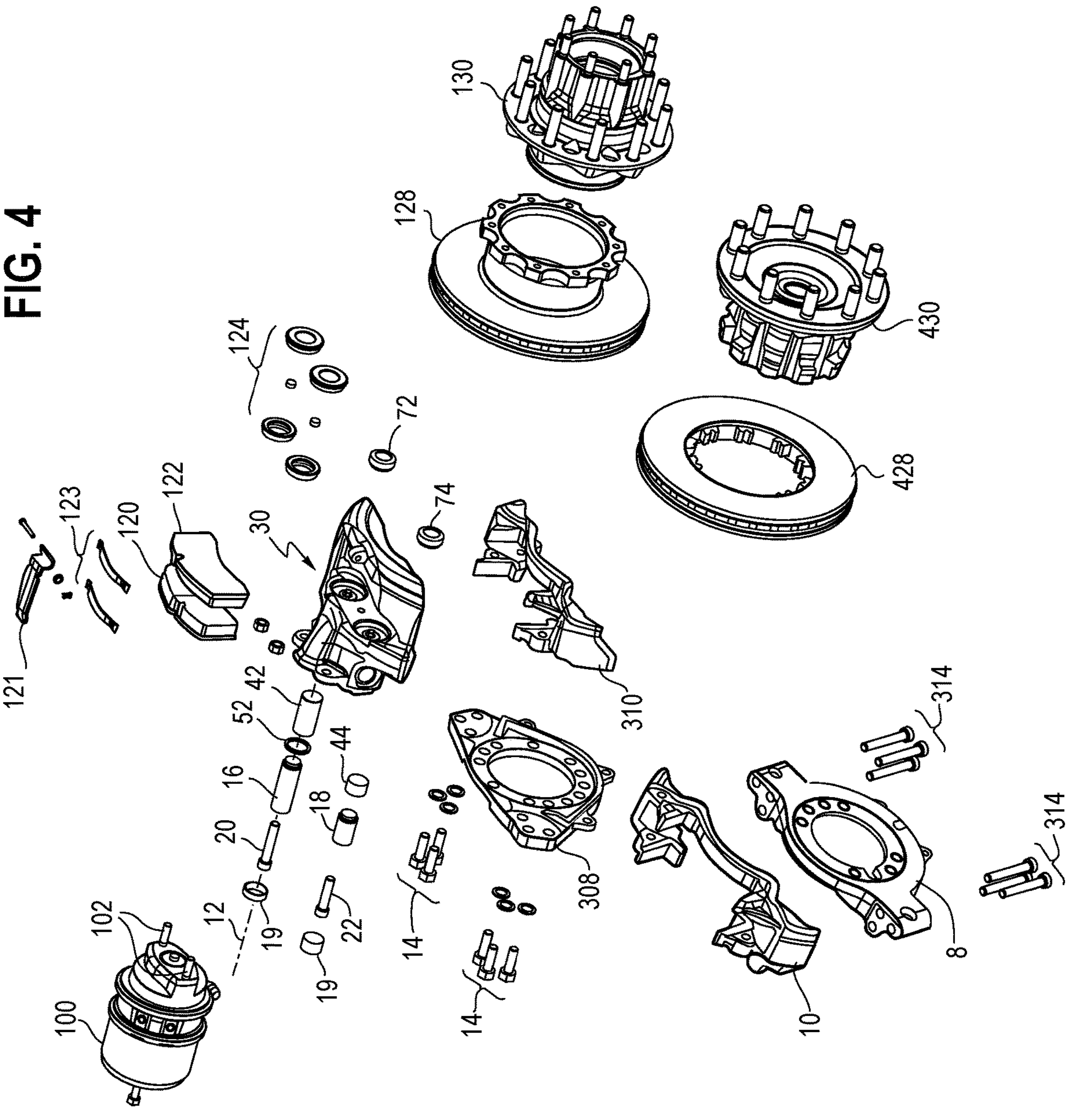
FIG. 4 is an exploded view of one embodiment of an air disc brake system.
Figure 9:
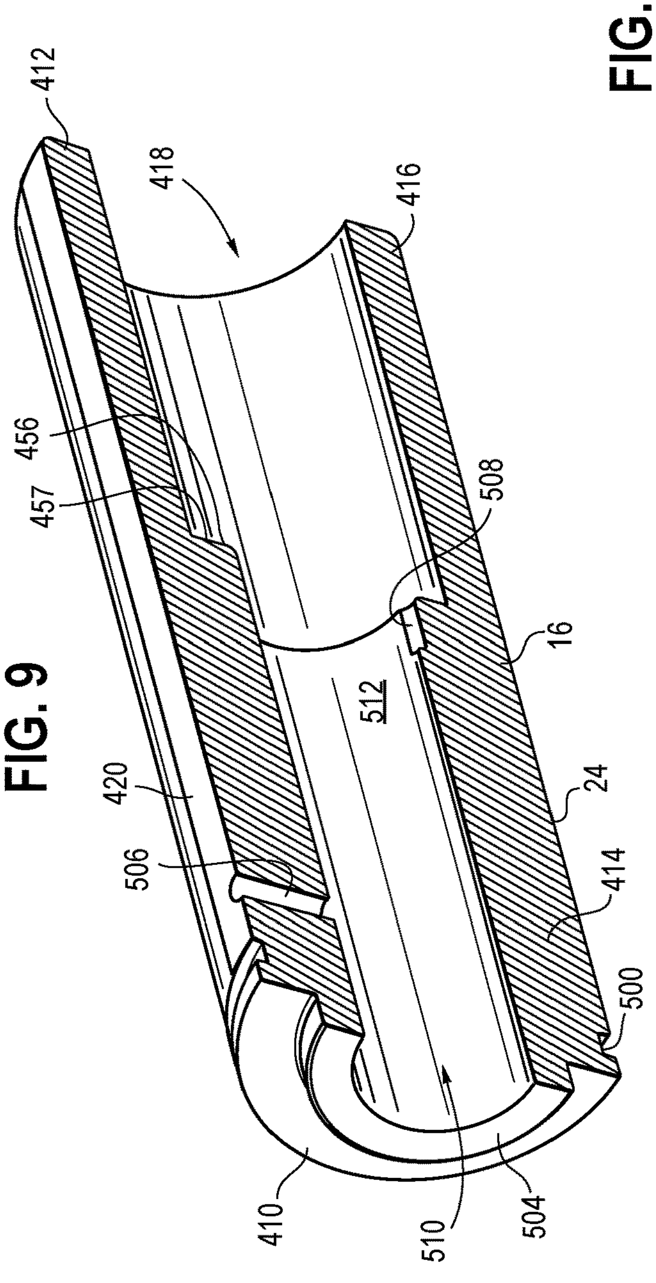
FIG. 9 is a cross-sectional perspective view of an alternative embodiment of a guide pin.
Figure 10:
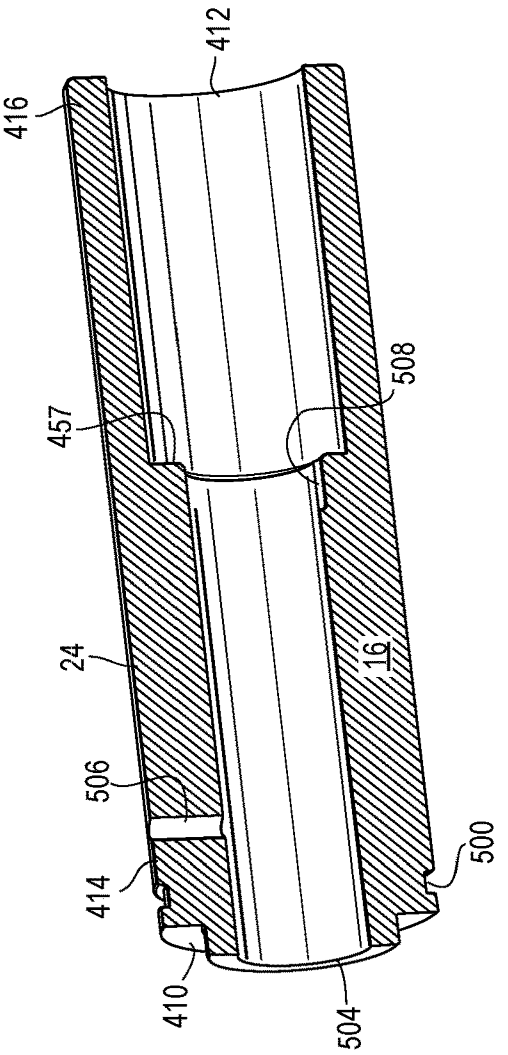
FIG. 10 is a cross-sectional view of another alternative embodiment of a guide pin.
Figure 11:
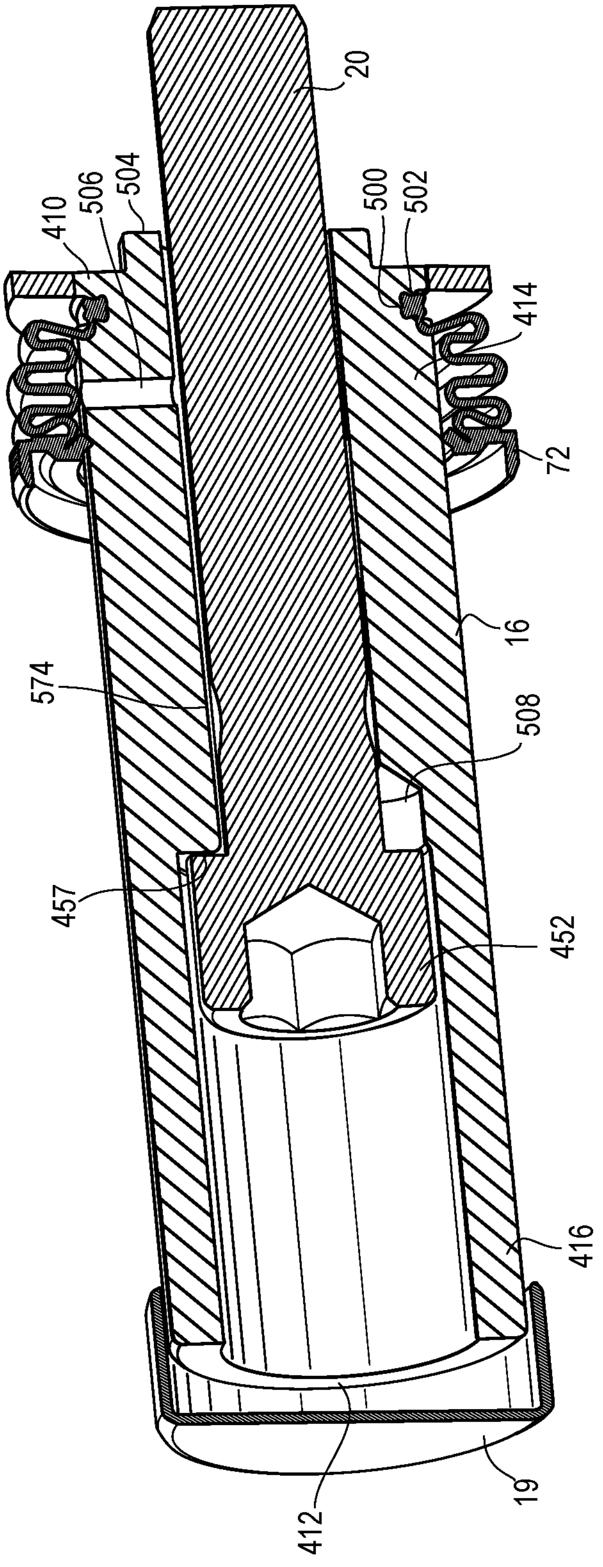
FIG. 11 is a cross-sectional view of a guide pin and fastener.

In another embodiment, shown in FIGS. 3, 9 and 11, a relief passage 510 includes a first passage 506 communicating between the outer bearing surface 24 and the through hole 418. In one embodiment, the first passage 506 extends radially inwardly from the bearing surface 24. The first passage 506 may open into the relief passage 420, as shown in FIG. 9, or may open directly into the bearing surface 24 as shown in FIG. 10, but is in fluid communication with the bearing surface 24 in either embodiment. In one embodiment, the relief passage 510 may include a second passage 508 communicating between the through hole 418 and a face 457, and may be defined as a groove or notch formed in the inner circumferential wall defining at least in part the through hole 418. The second passage 508 may extend longitudinally along the inner surface 512 of the through hole. The face 457 of the guide pin is engaged by the second end 452 of the fastener 20. The relief passage 510 may also include a clearance 514 between the fastener 20 and the through hole 418, wherein the clearance 514 communicates and allows air flow between the first and second passages 506, 508, the combination of which (clearance 514 and passages 506, 508) defines the relief passage 510. It should be understood that the relief passage 510 may be used alone, as shown in FIG. 10, or in combination with the relief passage 420 as shown in FIGS. 9 and 11. In the latter embodiment, it should be understood that the passage 506 may open into the relief passage 420, or into the bearing surface 24. The relief passage 420 allows lubricant to be distributed along the length of the guide pin 16, but also provides an escape passage for air and/or excess lubricant. The relief passage 510 also provide an escape passage for air trapped in the boot 72. It should be understood that the relief passage 510 may include only the first passage 506.

The guide pin 16 is received in the bore 34, and the caliper 30, and in particular the caliper housing 32, is slidably mounted on the guide pin 16 with the relief passage 420 in fluid communication with the first and second ends 402, 404 of the bore 34. The fastener 20 is disposed in the through hole 418 and has a first end 450 engaged with a mounting feature 440 and a second end 452 engaged with the guide pin. In one embodiment, the first end 450 is threaded and threadably engages a threaded hole defining the mounting feature 440. The second end 452 may be configured as a head of the bolt that engages a shoulder 456 defining the face 457 in the through hole 418 defined in the guide pin 16. The face 457 is oriented orthogonal to the longitudinal axis 12 in one embodiment. In other embodiments, the second end 452 may engage an end of the guide pin 16. A cap 19 is coupled to the caliper 30, for example by a press or threaded fit with and closing the second end 404 of the bore 34. The second end 404 of the bore and the cap 19 define the chamber 406 in fluid communication with the relief passage 420. The flexible boot seal 72 defines the first chamber 408 with the first end 402 of the bore and communicating with the relief passage 420.

Figure 5A:
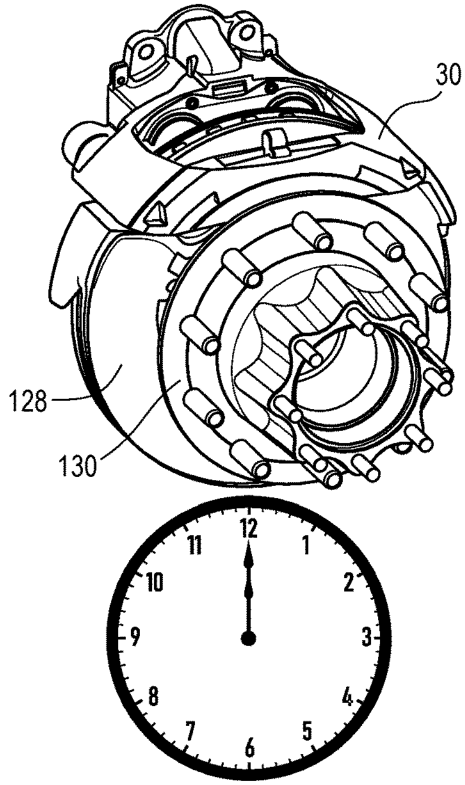
FIGS. 5A-C are perspective views of a caliper mounted in first, second and third positions.
Figure 5B:
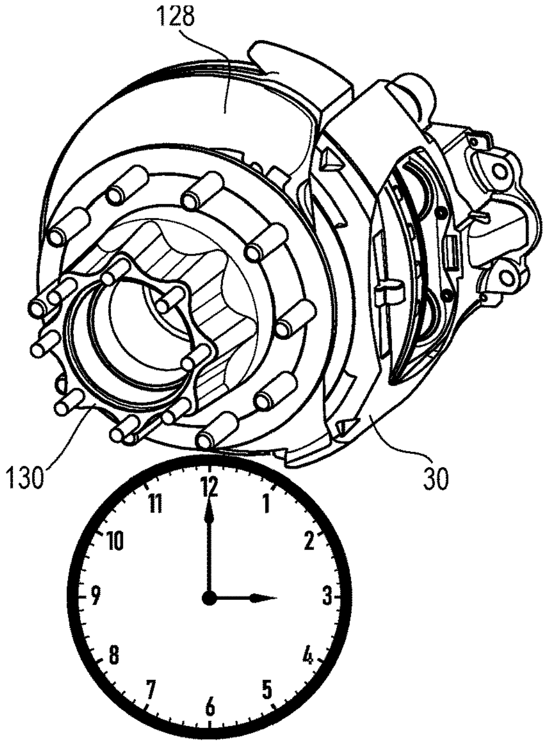
Figure 5C:
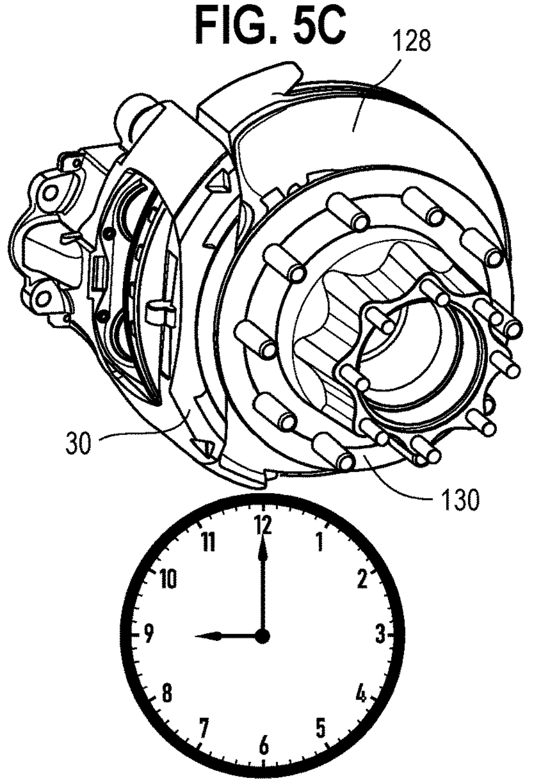

Referring to FIGS. 5A-C, the caliper 30 may be installed at a plurality of positions relative to the carrier, including a first/twelve O'clock position, a second/three o'clock position or a third/nine o'clock position. As shown in FIGS. 6A-C, the mass of the caliper 30 applies a first load (F1) to the guide pin 16 while a second load (F2) is applied by the caliper 30 to the guide pin 16 during braking. In either case, the relief passage 420 is oriented such that the relief passage is not in the load path created by one or both of the first and second loads (F1, F2), or a combined vector thereof. As such, the relief passage 420, or a centerline thereof, is oriented at an angle $\alpha$ between ±60 degrees (or an angle $\beta$ between ±120 degrees) relative to a horizontal plane 460 as shown in FIGS. 7A-C. In the first and second positions, shown in FIGS. 7A and B, the relief passage may be oriented at an angle $\alpha$ between 0 and 90 degrees (or an angle between $\beta$ between 90 and 180 degrees), in one embodiment at an angle $\alpha$ between 0 and 60 degrees (or an angle $\beta$ between 120 and 180 degrees) and in one embodiment, at an angle $\alpha$ of 45 degrees (or an angle $\beta$ of 135 degrees), all relative to the horizontal plane 460. In the third position, shown in FIG. 7C, the relief passage 420, or the centerline thereof, may be oriented at an angle $\alpha$ between negative 0 and 90 degrees (or an angle $\beta$ between negative 90 and 180 degrees), in one embodiment at an angle $\alpha$ between negative 0 and 60 degrees (or an angle $\beta$ between negative 120 and 180 degrees) and in one embodiment, at an angle $\alpha$ of negative 45 degrees (or an angle $\beta$ of negative 135 degrees), all relative to the horizontal plane 460.

In operation, one method of assembling the air disc brake system includes inserting the guide pin 16 into the bore 34 of the caliper 30, inserting the fastener 20 into the through hole 418 and engaging the mounting feature 440 of the carrier with the fastener. Before tightening the fastener 20, the guide pin 16 may be rotated to the proper position, or clocked, as shown in FIGS. 7A-C, such that the relief passage 420 is properly oriented and is not positioned in, or adversely affect, the load path between the caliper housing 32 and the guide pin 16. The method further includes installing the cap 19 on the caliper 30 and closing the second end 404 of the bore 34. In one embodiment, the cap 19 may be installed last, such that any air pressure in the chamber 408 defined by the boot seal 72 may escape through the relief passage 420 and out the second end 404 of the bore 34.

Figure 2:
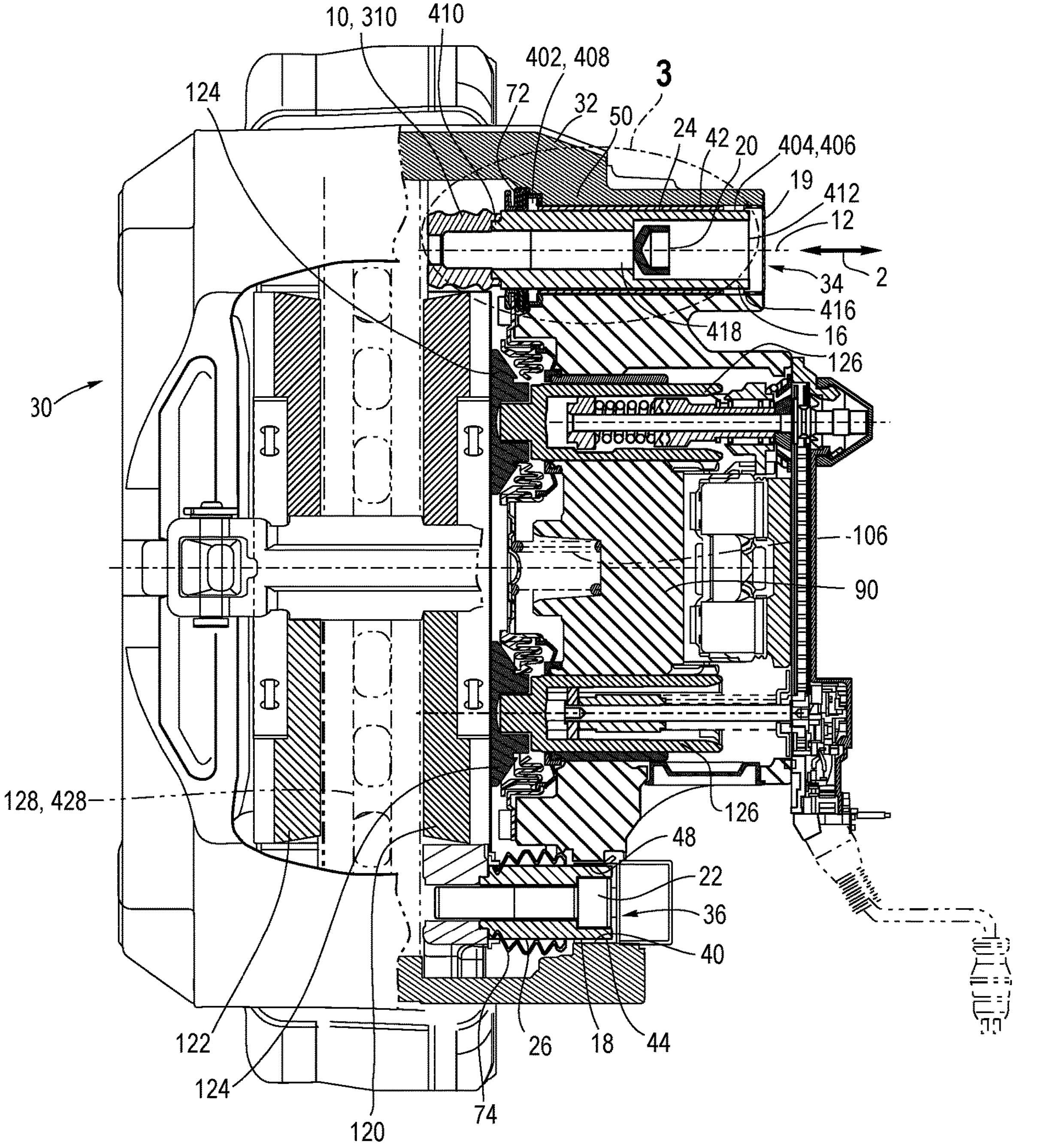
FIG. 2 is a second cross-sectional view of the air disc brake system.

Referring to FIGS. 1 and 2, the caliper housing 32 defines a cavity 80. A lever 82 is disposed in the cavity and is supported by an eccentric bearing 84 disposed in the cavity. The lever 82 has a first portion 86, or arm, extending laterally into the cavity and a second portion 88 engaging a bridge 90, for example through a bearing 92. The first portion 86 is engaged by an actuator 100, which may be mounted to the caliper housing 32 with fasteners 102. The bridge 90 is biased inwardly, away from the brake pads 120, 122 along a longitudinal axis 104 by a return spring 106.

The actuator 100 includes an air supply port 108 in fluid communication with a service brake chamber 110. As air is introduced into the chamber during application of the vehicle brakes, the air applies pressure in the chamber and expands the diaphragm 112 which in turn applies a force to and moves a pressure plate 114 and pushrod 116 in an axial direction. The pushrod 116 engages the first portion 86 of the lever, for example by way of a cup 118 or ball joint, and pushes the lever 82. The lever 82 thereafter rotates and pivots about the eccentric bearing 84 from an unactuated position to an actuated position. As the lever 82 pivots, the second portion 88 of the lever engages and moves the bridge 90 outwardly in the axial direction from a first position to a second position against the force of the return spring 106. The bridge 90 is coupled to and moves a pair of tubes and tappets 124, 126 in the longitudinal direction 2 so as to move an inner brake pad 120 in the longitudinal direction. The inner brake pad 120 engages the brake rotor 128, 428. Further movement of the bridge 90 forces the caliper 30, sliding on the guide pins 16, 18, away from the rotor 128, 428 in the longitudinal direction 2 from a non-braking position to a braking position. The sliding movement of the caliper 30 on the guide pins 16, 18 moves the outer brake pad 122 inwardly toward an opposite side of the rotor 128, thereby clamping the rotor 128, 428 between the inner and outer brake pads 120, 122 and applying a braking force to the brake rotor 128, 428 and attached wheel 130, 431. The brake pads 120, 122 are coupled to the carrier and caliper with a pad retainer 121 and springs 123. As the caliper 30 is moved from the non-braking position to the braking position, the friction ring 52 grips the guide pin and is elastically deformed from a first configuration, which may be an undeformed configuration or slightly deformed configuration, to a second deformed configuration, which has greater deformation than the first configuration, as the inner circumferential surface 62 frictionally engages the outer circumferential surface 24 of the guide pin 16.

When the vehicle brakes are released, the air pressure in the service brake chamber 110 is exhausted and the return springs 117, 106 in the chamber and in the cavity acting on the bridge 90 return the air disc brake to a neutral, non-braked position. To maintain an appropriate running clearance gap between the rotor 128, 428 and the brake pads 120, 122 over time, the non-braked position may be mechanically adjusted by a mechanism in the caliper. The adjustment mechanism operates automatically whenever the brakes are activated, to compensate for rotor and brake pad wear and to keep the running clearance constant.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An air disc brake system comprising:

a carrier having a mounting feature;

a guide pin comprising longitudinally spaced first and second ends, an outer bearing surface comprising longitudinally spaced first and second ends, and an interior through hole extending between and open at the first and second ends of the guide pin, wherein the guide pin comprises a relief passage on an outside surface of the guide pin;

a caliper comprising a longitudinally extending bore having spaced apart first and second ends, wherein the guide pin is received in the bore, and wherein the caliper is slidably mounted on the guide pin with the relief passage in fluid communication with the first and second ends of the bore; and a fastener disposed in the through hole and comprising a first end engaged with the mounting feature and a second end engaged with the guide pin; and a cap coupled to the caliper and closing a second end of the bore;

wherein the relief passage comprises a first passage communicating between the outer bearing surface and the through hole;

wherein the guide pin comprises a face engaged by the second end of the fastener;

wherein the relief passage further comprises a second passage communicating between the through hole and the face; and wherein the relief passage further comprises a clearance between the fastener and the through hole, wherein the clearance communicates between the first and second passages.

2. The air disc brake system of claim 1 wherein the outer bearing surface is cylindrical.

3. The air disc brake system of claim 2 wherein the relief passage comprises a longitudinal channel formed in and extending radially inwardly from the outer bearing surface.

4. The air disc brake system of claim 2 wherein the relief passage comprises a flat, wherein the guide pin has a major segment cross section taken orthogonal to a longitudinal axis of the guide pin.

5. The air disc brake system of claim 1 wherein the mounting feature comprises a threaded hole, and wherein the first ends of the fastener is threadably engaged with the threaded hole.

6. The air disc brake system of claim 1 further comprising a flexible boot seal disposed between the guide pin and the caliper, wherein the flexible boot seal defines a first chamber communicating with the first end of the bore and the relief passage.

7. The air disc brake system of claim 6 wherein the cap defines a second chamber at the second end of the bore, wherein the relief passage communicates with the second chamber.

8. The air disc brake system of claim 1 wherein the relief passage is oriented±60 degrees relative to a horizontal plane.

9. The air disc brake system of claim 8 wherein the relief passage is oriented±45 degrees relative to the horizontal plane.

10. The air disc brake system of claim 1 wherein the caliper comprises a bushing disposed in the bore and slidably engaging the outer bearing surface of the guide pin.

11. The air disc brake system of claim 1 wherein the relief passage further comprises a longitudinal channel formed in and extending radially inwardly from the outer bearing surface, and wherein the first passage is open between the channel and the through hole.

12. The method of claim 11 further comprising disposing a flexible boot seal between the guide pin and the caliper, wherein the flexible boot seal defines a first chamber communicating with the first end of the bore and the relief passage.

13. The method of claim 12 wherein the cap defines a second chamber at the second end of the bore, wherein the relief passage communicates with the second chamber.

14. The method of claim 11 wherein the relief passage is oriented ±60 degrees relative to a horizontal plane.

15. The method of claim 14 wherein the relief passage is oriented at ±45 degrees relative to the horizontal plane.

16. The method of claim 11 wherein the mounting feature comprises a threaded hole, and wherein engaging the mounting feature of the carrier comprises threadably engaging the threaded hole with the fastener.

17. A method of assembling an air disc brake system comprising:

inserting a guide pin into a bore of a caliper, wherein the bore has first and second ends, wherein the guide pin comprises an outer bearing surface, and an interior through hole extending between and open at first and second ends of the guide pin, wherein the guide pin comprises a relief passage on an outside surface of the guide pin and in fluid communication with the first and second ends of the bore;

inserting a fastener into the through hole and engaging a mounting feature of a carrier; and installing a cap on the caliper and closing the second end of the bore;

wherein the outer bearing surface is cylindrical;

wherein the relief passage comprises a channel extending radially inwardly from the outer bearing surface; and wherein the relief passage comprises a flat, wherein the guide pin has a major segment cross section.

18. The method of claim 17 wherein the relief passage comprises a first passage communicating between the outer bearing surface and the through hole.

19. The method of claim 18 wherein inserting the fastener into the through hole comprises engaging a face of the guide pin with a shoulder, and wherein the relief passage further comprises a second passage communicating between the through hole and the face.

20. The method of claim 19 wherein the relief passage further comprises a clearance between the fastener and the through hole, wherein the clearance communicates between the first and second passages.

21. A guide pin for use in an air brake system comprising:

longitudinally spaced first and second ends;

an outer bearing surface comprising longitudinally spaced first and second ends;

an interior through hole extending between and open at the first and second ends of the guide pin; and a relief passage in fluid communication with the first end of the outer bearing surface and the second end of the guide pin, wherein the relief passage comprises a flat, wherein the guide pin has a major segment cross section taken orthogonal to a longitudinal axis of the guide pin.

22. The guide pin of claim 21 further comprising an annular groove separating the outer bearing surface and the first end of the guide pin.

23. The guide pin of claim 21 wherein the relief passage comprises a first passage communicating between the outer bearing surface and the through hole.

24. The guide pin of claim 23 wherein the guide pin comprises a face oriented orthogonal to a longitudinal axis of the guide pin, and wherein the relief passage further comprises a second passage communicating between the through hole and the face.

* * * * *